US011102829B2

(12) United States Patent
Anchan et al.

(10) Patent No.: US 11,102,829 B2
(45) Date of Patent: Aug. 24, 2021

(54) CHARGE-BASED PERIPHERAL DEVICE SELECTION (71) Applicant: ZEBRA TECHNOLOGIES CORPORATION, Lincolnshire, IL (US)

(72) Inventors: Dikshith Anchan, Bangalore (IN); Vikas N. Channappagoudra, Ron (IN); Vattem Manohar Reddy, Gooty (IN); Deepak Ayyagari, Bangalore (IN)

(73) Assignee: Zebra Technologies Corporation, Lincolnshire, IL (US)

( * ) Notice: Subject to any disclaimer, the term of this patent is extended or adjusted under 35 U.S.C. 154(b) by 3 days.

(21) Appl. No.: 16/692,446

(22) Filed: Nov. 22, 2019

(65) Prior Publication Data
US 2021/0160938 A1 May 27, 2021

(51) Int. Cl.
*H04W 76/14* (2018.01)
*H04W 8/00* (2009.01)
*H04W 4/80* (2018.01)

(52) U.S. Cl.
CPC .......... *H04W 76/14* (2018.02); *H04W 4/80* (2018.02); *H04W 8/005* (2013.01)

(58) Field of Classification Search
None
See application file for complete search history.

(56) References Cited

U.S. PATENT DOCUMENTS

| | | | | |
|---|---|---|---|---|
| 2005/0009577 A1* | 1/2005 | Kangas | ............... | H02J 7/00036 455/572 |
| 2015/0042291 A1* | 2/2015 | Racine | .................. | H02J 7/0047 320/137 |
| 2015/0043427 A1* | 2/2015 | K.M. | ....................... | H04W 8/22 370/328 |
| 2015/0289152 A1* | 10/2015 | Shanmugam | ........... | H04L 43/50 455/425 |
| 2016/0065666 A1* | 3/2016 | Kim | ..................... | H04L 67/1051 709/203 |
| 2016/0072638 A1* | 3/2016 | Amer | ..................... | H04L 67/125 398/106 |
| 2018/0063311 A1* | 3/2018 | Fathollahi | ............... | H04W 4/80 |
| 2018/0302294 A1* | 10/2018 | Diancin | ................ | H04L 41/147 |
| 2019/0342170 A1* | 11/2019 | Pathak | ................ | H04L 41/0869 |

* cited by examiner

Primary Examiner — Gennadiy Tsvey (57) ABSTRACT

A primary wireless communication device includes: an output assembly; a short-range communications assembly; a pairing controller configured to: send a discovery request for detection by a secondary wireless communication device; responsive to sending the discovery request, receive a discovery response from the secondary wireless communication device, the discovery response containing an identifier of the secondary wireless communication device and charge data for the secondary wireless communication device; control the output assembly to present the identifier of the secondary wireless communication device and a charge indicator for the secondary wireless communication device; obtain an instruction to establish a paired communication link with the secondary wireless communication device; and responsive to obtaining the instruction, initiate a pairing stage to establish the paired communication link.

8 Claims, 5 Drawing Sheets

CHARGE-BASED PERIPHERAL DEVICE SELECTION

BACKGROUND

A wide variety of peripheral devices such as barcode scanners, headsets, augmented reality (AR) glasses, label printers and the like may be paired with a mobile computer to extend the functionality of the mobile computer. Such peripherals may be battery-powered, and discharging of the battery may therefore interrupt prolonged use.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Mobile computing devices can be employed in a wide variety of environments. In some environments, peripheral devices may be employed to extend the functionality of a mobile computing device. For example, in a transport and logistics facility, a factory setting, or the like, portable barcode scanners may be employed to provide barcode scanning functionality to mobile computers carried by workers in the facility. For example, a finger-mounted barcode scanner can be connected with a mobile computer, enabling data obtained from barcodes to be captured by the mobile computer via control of the barcode scanner.

Other examples of devices that can be employed alongside mobile computers to extend the functionality available to the operator of the mobile computer include headsets (e.g. equipped with speakers and microphones and allowing hands-free communication with other workers), portable label printers, and the like.

The above-mentioned peripheral devices may be connected to a mobile computer wirelessly, for example via a short-range communications standard such as Bluetooth™. Further, the peripheral devices can be powered by internal batteries (e.g. rather than drawing power from the host mobile computer). When an operator of a mobile computer selects a peripheral for use in conjunction with the mobile computer, the peripheral and the mobile computer establish a wireless communication link therebetween. After the link has been established, the peripheral device and the mobile computer can exchange data. For example, the peripheral device may send its current battery charge level to the mobile computer for presentation to the operator. The battery level may, however, be insufficient to support operation of the peripheral device for a full shift. It may therefore be necessary to disconnect the peripheral device from the mobile computer, select another peripheral device, and repeat the pairing process. As a result, deployment time is increased, and the battery of the mobile computer itself incurs additional discharge from repeated pairings.

Examples disclosed herein are directed to a primary wireless communication device including: an output assembly; a short-range communications assembly; a pairing controller configured to: send a discovery request for detection by a secondary wireless communication device; responsive to sending the discovery request, receive a discovery response from the secondary wireless communication device, the discovery response containing an identifier of the secondary wireless communication device and charge data for the secondary wireless communication device; control the output assembly to present the identifier of the secondary wireless communication device and a charge indicator for the secondary wireless communication device; obtain an instruction to establish a paired communication link with the secondary wireless communication device; and responsive to obtaining the instruction, initiate a pairing stage to establish the paired communication link.

Additional examples disclosed herein are directed to a method, comprising: sending a discovery request from a primary wireless communication device, for detection by a secondary wireless communication device; responsive to sending the discovery request, receiving a discovery response at the primary wireless communication device from the secondary wireless communication device, the discovery response containing an identifier of the secondary wireless communication device and charge data for the secondary wireless communication device; controlling an output assembly of the primary wireless communication device to present the identifier of the secondary wireless communication device and a charge indicator for the secondary wireless communication device; obtaining an instruction to establish a paired communication link with the secondary wireless communication device; and responsive to obtaining the instruction, initiating a pairing stage to establish the paired communication link.

Further examples disclosed herein are directed to a secondary wireless communication device, comprising: a short-range communications assembly; pairing controller configured to: receive a discovery request from a primary wireless communication device; in response to receiving the request, send a discovery response including at least (i) an identifier of the secondary wireless communication device and (ii) charge data for the second wireless communication device.

Figure 1:
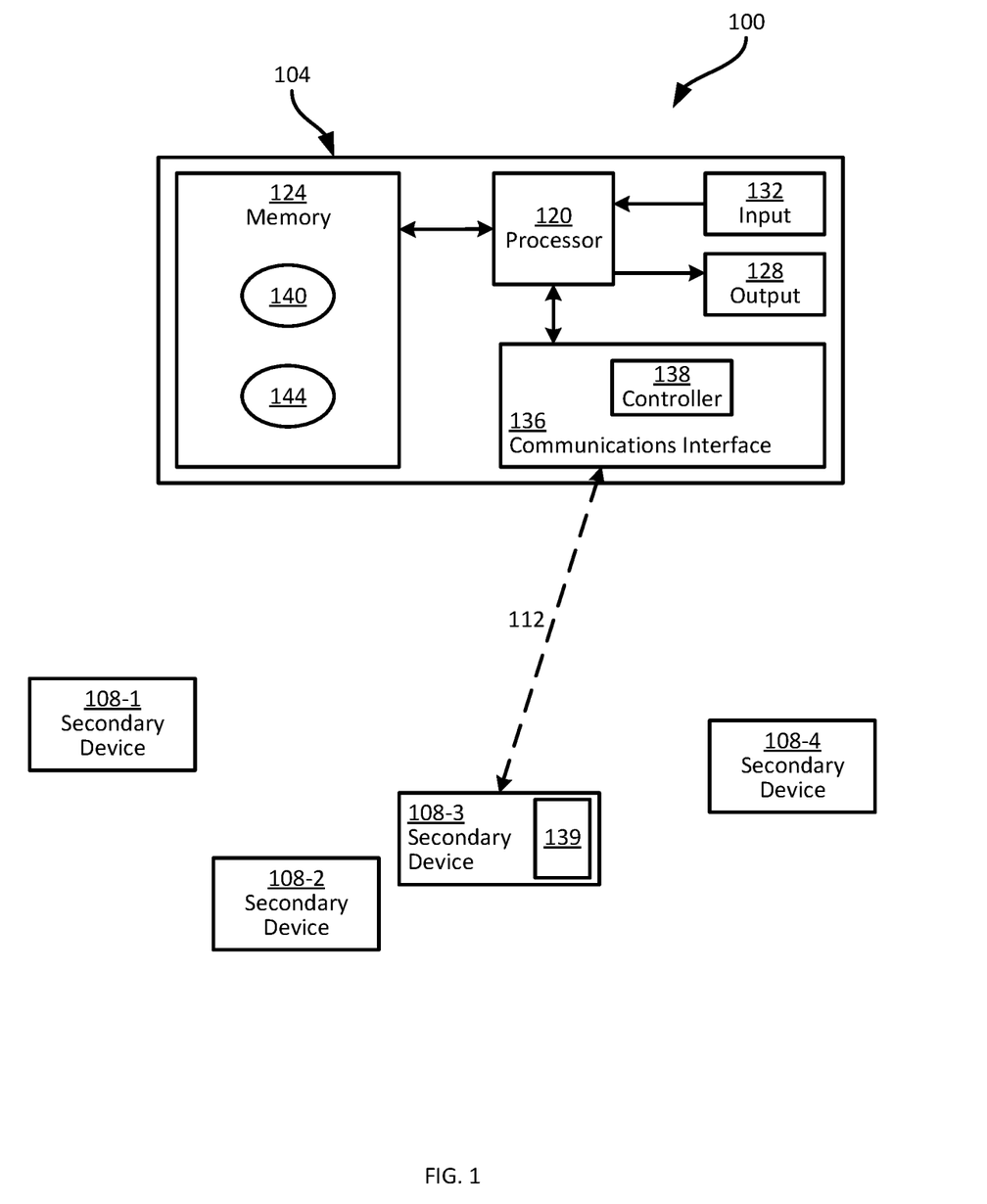
FIG. 1 is a block diagram of a system for peripheral device selection.

FIG. 1 depicts a system 100 including a primary wireless communication device 104 (also simply referred to as the primary device 104). The primary device 104 can be a mobile computer, a smart phone, a tablet computer, or the like. The system 100 also includes at least one secondary wireless communication device, of which four examples 108-1, 108-2, 108-3 and 108-4 are shown in FIG. 1. The secondary wireless communication devices 108 (also referred to simply as secondary devices 108 or peripheral devices 108) can be any combination of peripherals, including barcode scanners, radio frequency identification (RFID) readers, label printers, and the like. The peripheral devices 108 are connectable to the primary device 104 via wireless links, such as the wireless link 112 shown between the primary device 104 and the peripheral device 108-3.

In the present example, the link 112, and any links established between the primary device 104 and other peripheral devices 108, is a short-range wireless link, based on a short-range communications standard such as the Bluetooth™ standard. For example, the link 112 and other links established according to this disclosure may be Bluetooth™ connections based on version 2.1, or on any more recent version, of the Bluetooth™ specifications. In one embodiment, for versions 4.0 and later, which include both Classic and Bluetooth Low Energy (BLE) variants, the connections contemplated herein may be Classic connections.

The establishment of a link between the primary device 104 and a peripheral device 108 includes a first stage also referred to as a discovery stage, and a second stage also referred to as a pairing stage. In general, in the discovery stage the primary device 104 obtains identifying information corresponding to one or more peripheral devices 108. Using the identifying information from the discovery stage, the primary device 104 is enabled to initiate the pairing stage with at least one of the peripheral devices 108 to establish a communications link over which the primary device 104 and the peripheral device(s) 108 can exchange any suitable data (e.g. barcode captures, instructions to print labels, and the like).

As will be discussed in greater detail below, the primary device 104 and the secondary devices 108 implement the above-mentioned discovery and pairing stages to enable provision of battery level information from the secondary devices 108 to the primary device 104 in the discovery stage rather than after the link has been established (i.e. after the pairing stage is complete). Before further discussion of the above functionality, certain internal components of the primary device 104 will be discussed as illustrated in FIG. 1.

The primary device 104 includes a central processing unit (CPU), also referred to as a processor 120 interconnected with a non-transitory computer readable storage medium, such as a memory 124. The memory 124 includes any suitable combination of volatile memory (e.g. Random Access Memory (RAM)) and non-volatile memory (e.g. read only memory (ROM), Electrically Erasable Programmable Read Only Memory (EEPROM), flash). The processor 120 and the memory 124 each comprise one or more integrated circuits (ICs).

The primary device 104 also includes at least one output assembly 128 interconnected with the processor 120. The output assembly 128 includes any one of, or any suitable combination of, a display, a speaker, and the like. The output assembly 128 receives output from the processor 120 and presents the output, e.g. via the emission of sound from a speaker, the rendering of visual indications on a display, the like.

The primary device 104 also includes an input assembly 132. The input assembly includes any one of, or any suitable combination of, a keypad, a touch screen (e.g. integrated with the above-mentioned display), a microphone, and the like. The input assembly 132 receives input and provides data representative of the received input to the processor 120.

The primary device 104 also includes a communications interface 136, enabling the primary device 104 to exchange data with other computing devices, such as the peripheral devices 108. The communications interface 136 includes any suitable hardware (e.g. transmitters, receivers and the like) allowing the primary device 104 to communicate, e.g. with the peripheral devices 108, over links such as the link 112. The communications interface 136 also includes a controller 138 configured to control the above-mentioned hardware components. The controller 138 can be implemented as an IC, a portion of an IC implementing other components of the communications interface, or the like. The controller 138 can be implemented, for example, as a field-programmable gate array (FPGA) or other suitable hardware element, configured to execute instructions stored in the controller 138 itself or in an associated memory (which may be distinct from the memory 124).

In some examples, in which the peripheral devices 108 are paired with the primary device 104 via short-range links such as a Bluetooth™ links, the controller 138 can implement at least a portion of the Bluetooth™ protocol stack. For example, the controller 138 can implement the radio, baseband, link controller, link manager, and host controller interface of the Bluetooth™ protocol stack, which are approximate equivalents to, collectively, the physical layer, the data link layer, the network layer and the transport layer of the OSI model. The controller 138 can also implement the logical link control and adaptation (L2CAP), radio frequency communication (RFCOMM) and service discovery protocol (SDP) of the Bluetooth™ stack, which are approximate equivalents to, collectively, the session layer and the presentation layer of the OSI model.

The secondary devices 108 also include communications interfaces and corresponding controllers; an example interface and controller 139 is shown in FIG. 1 for the secondary device 108-3. It will be understood that the remaining secondary devices 108 also include such interfaces and controllers.

The memory 124 of the primary device 104 stores one or more applications, each including a plurality of computer readable instructions executable by the processor 120. The execution of the above-mentioned instructions by the processor 120 causes the primary device 104 to implement certain functionality, as discussed herein. The applications are therefore said to be configured to perform that functionality in the discussion below.

In the present example, the memory 124 of the primary device 104 stores a peripheral management application 140, also referred to herein as the application 140. The application 140, in conjunction with the communications interface 136 (and specifically the controller 138), is configured to detect (i.e. discover) peripheral devices 108 that are candidates for pairing with the primary device 104, and to present certain information via the output assembly 128 for selection of a peripheral device 108 and establishment of a communications link with that peripheral device 108. The application 140 and the controller 138 can therefore be referred to collectively as a pairing controller.

The memory 124 can also store one or more additional applications, an example 144 of which is shown in FIG. 1. The additional application 144 can be executed by the processor 120 to perform any of a wide variety of actions. For example, the application 144 can be configured to process data received from, or data for transmission to, the linked peripheral device 108. When a barcode scanner peripheral 108 is connected with the primary device 104, for example, the application 144 can be configured to receive data captured by the barcode scanner, e.g. for transmission to a server, for presentation on the display, or the like.

Figure 2:
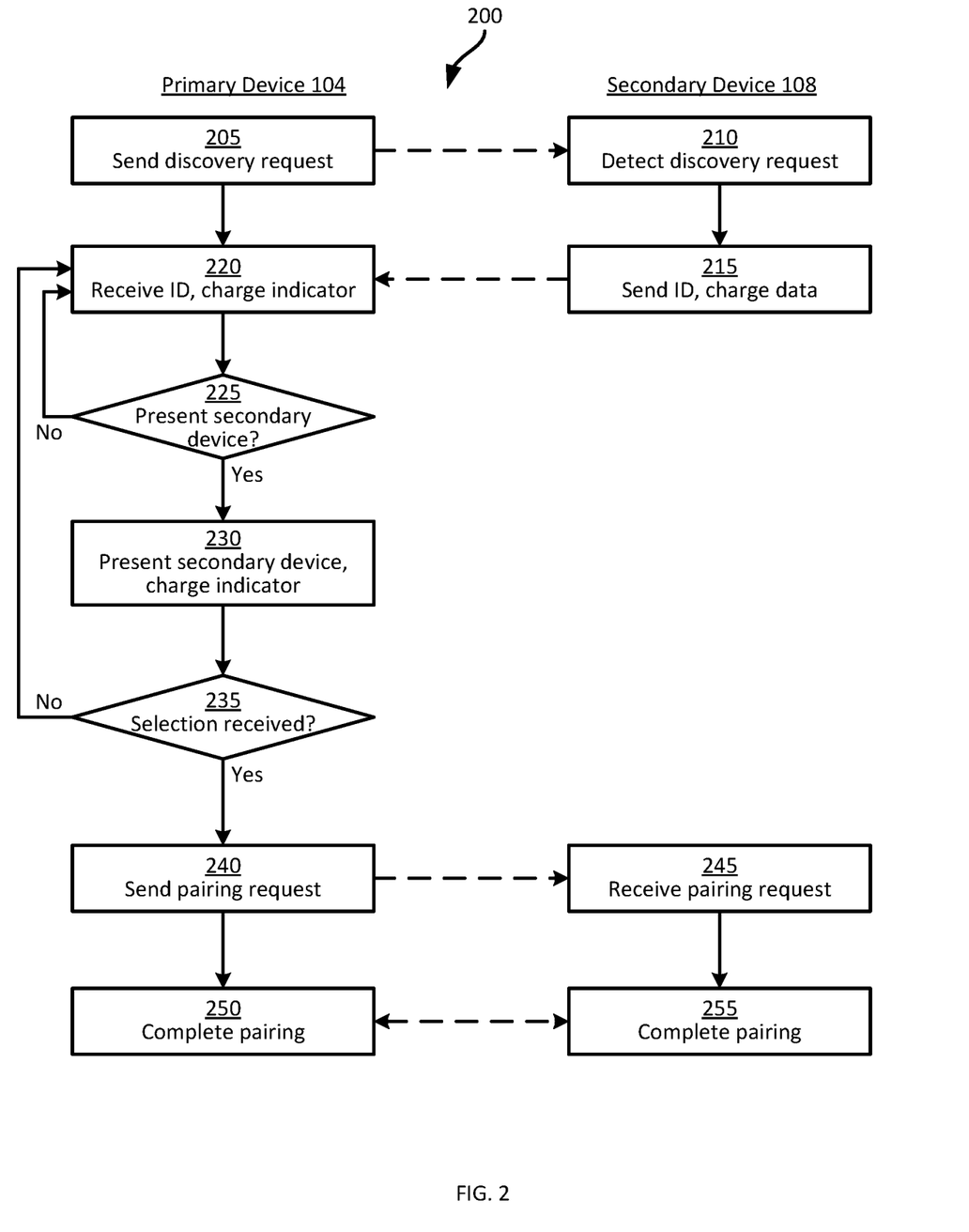
FIG. 2 is a flowchart of a method of peripheral device selection.

Turning now to FIG. 2, an example method 200 of peripheral device selection is illustrated in accordance with the teachings of this disclosure. As indicated by the heading text in FIG. 2, certain blocks of the method 200 are performed by the primary device 104, while other blocks of the method 200 are performed by the secondary, or peripheral, device 108. The flowchart of FIG. 2 assumes a single peripheral device 108, but it will be understood that a plurality of peripheral devices 108 may be present and perform distinct, substantially simultaneous, instances of the blocks assigned to the peripheral device 108. The primary device 104, by extension, can process data from a plurality of peripheral devices 108 via performance of the method 200.

At block 205, the primary device 104 is configured to initiate the above-mentioned discovery stage of the establishment of a link between the primary device 104 and one or more peripheral devices 108. For example, the primary device 104, and specifically the controller 138, generates and transmits a discovery request via the communications interface 136. The controller 138 can initiate block 205 automatically, or can receive an instruction (e.g. from the application 140) to initiate block 205. The discovery request, when the devices 104 and 108 implement the Bluetooth™ standard, may be referred to as an inquiry. The discovery request is not addressed to any particular peripheral device 108. Rather, the discovery request is a message broadcast to the vicinity of the primary device 104, for detection by any nearby peripheral devices (e.g. within about 10 meters or about 33 feet for Class 2 Bluetooth™ devices). The discovery request contains an identifier (e.g. a media access control, or MAC, address of the primary device 104).

At block 210, a peripheral device 108 detects the discovery request transmitted at block 205, and at block 215 the peripheral device 108 sends a discovery response that contains at least an identifier of the peripheral device 108, and charge data of the peripheral device 108. The discovery response is addressed to the primary device 104 using the primary device identifier mentioned above (e.g. the MAC address from the discovery request).

The charge data included in the response sent at block 215 is indicative of a remaining level of charge in a battery of the peripheral device 108. For example, the charge data can include a state of charge indicator, expressed as a percentage. In other examples, the charge data can include a time period indicating an estimated remaining run time, based on previously collected usage data at the peripheral device 108 itself. In still further examples, the charge data can include both the above-mentioned level of charge, and previously-collected usage data (without an estimated run time).

Figure 3:
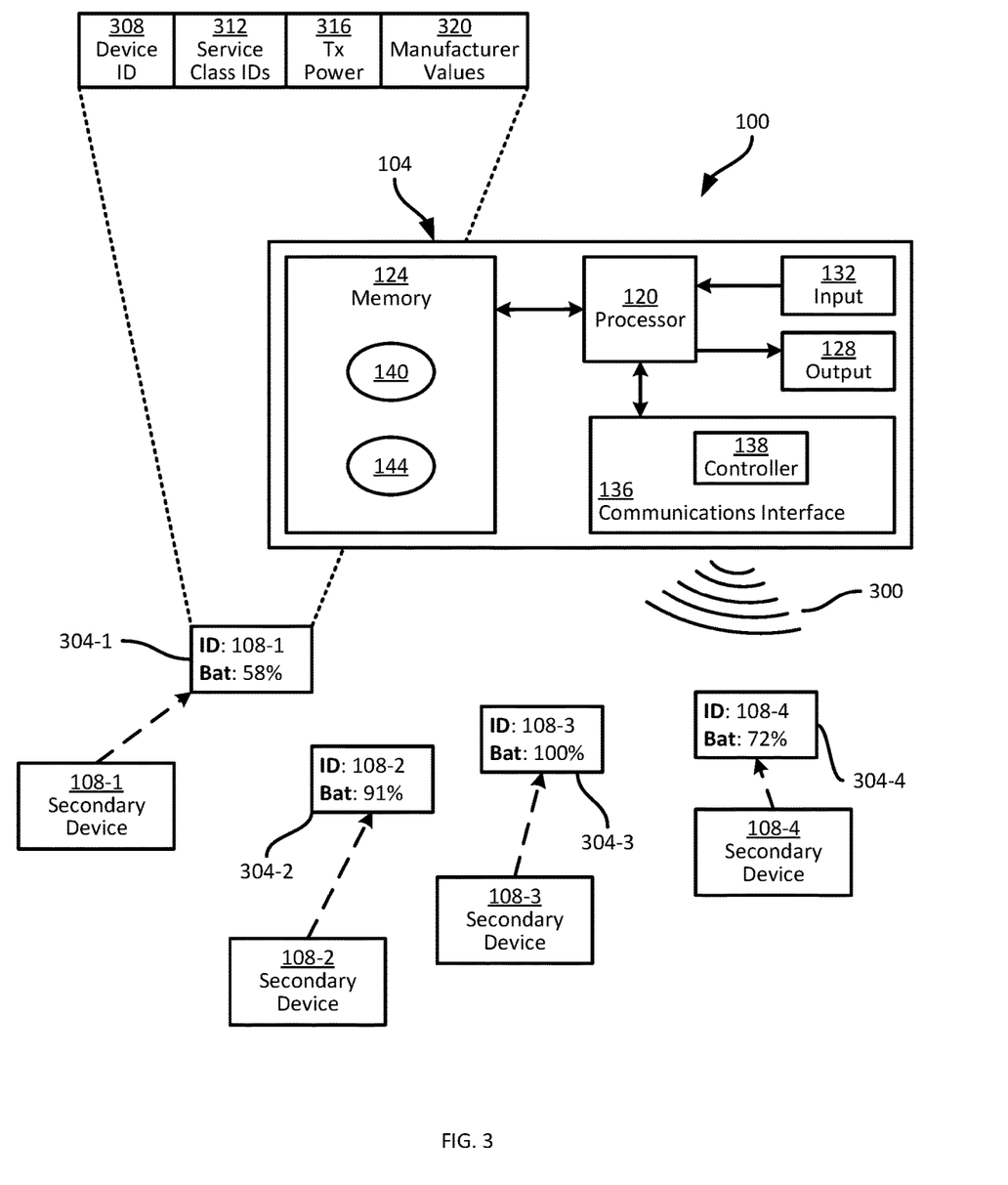
FIG. 3 is a block diagram illustrating a performance of blocks 205-220 of the method of FIG. 2.

Turning to FIG. 3, a performance of block 205 by the primary device 104 is illustrated, along with respective performances of blocks 210 and 215 by each of the peripheral devices 108. In particular, a transmission of a discovery request 300 is shown, and resulting discovery responses 304-1, 304-2, 304-3 and 304-4 from the peripheral devices 108 are also shown. As seen in FIG. 3, the responses 304 include identifiers of the corresponding peripheral devices 108, as well as state of charge indicators that indicate the remaining battery capacity of each peripheral device 108 as a percentage.

In implementations in which the primary device 104 and the peripheral devices 108 establish communications links according to the Bluetooth™ standard, the discovery responses 304 transmitted at block 215 can be modified extended inquiry responses (EIRs). As will be apparent to those skilled in the art, certain peripheral devices 108 can be configured to transmit, in response to the inquiry (i.e. the discovery request 300), an inquiry response. Other peripheral devices 108 can be configured to transmit an extended inquiry response, which supplements the contents of the inquiry response with additional data. Specifically, as illustrated in FIG. 3, an EIR can contain values that include a device identifier 308 (e.g. a MAC address, device name, or combination thereof) and clock synchronization information, as in an inquiry response. The EIR can also contain one or more service identifiers 312 of any services supported by the peripheral device 108, and a transmission power 316 of the peripheral device 108. The EIR can also contain a field containing manufacturer-specific values.

In the present example, the EIRs generated by the peripheral devices 108 further contain the above-mentioned charge data. The charge data can be contained in a newly created field of the EIR, or can be contained in the field 320 otherwise reserved for manufacturer's data.

Returning to FIG. 2, at block 220 the primary device 104 receives the discovery responses 304 transmitted by the peripheral devices 108 at block 215. In the present example performance of the method 200, it is assumed that the discovery message 300 transmitted at block 205 is detected by all of the peripheral devices 108, and that one performance of block 205 by the primary device 104 therefore leads to four performances of block 215 (by each of the peripheral devices 108) and thus to the receipt of four discovery responses 304 at block 220. In other performances of the method 200, the primary device 104 can send more than one discovery request 300. For example, the primary device 104 can transmit a new discovery request periodically at least until a link is established with a peripheral device, by repeating block 205. Depending on how many discovery responses 304 are received within a predetermined time period (e.g. 5 seconds, although both shorter and longer periods are also contemplated), the primary device 104 may proceed to block 225, and any subsequently received responses 304 may be processed in a later performance of the method 200.

At block 225, for each discovery response 304 received at block 220, the primary device 104 determines whether to present the corresponding peripheral device 108 via the output assembly 128, for selection by an operator of the primary device 104. The determination at block 225 can include comparing the charge data received from the peripheral device 108 to a predetermined threshold stored at the primary device 104. For example, when the charge data received from the peripheral device 108 includes a state of charge indicator, the threshold applied at block 225 can be a percentage (e.g. 60%, although thresholds above and below 60% may also be applied). In other examples, the threshold can be a period of time, e.g. when the charge data includes an estimated remaining run time. In further examples, the primary device 104 can generate a remaining run time estimate from usage data provided by the peripheral device 108, for comparison to the above-mentioned time period threshold.

In some examples, the performance of block 225 can simply be omitted, which has the same effect as the determination at block 225 being affirmative for every peripheral device 108.

At block 230, the primary device 104 presents any peripheral devices 108 for which the determination at block 225 was affirmative, by controlling the output assembly 128. If the determination at block 225 was negative for every discovery response received at block 220, then the primary device 104 returns to block 205 or block 220 rather than proceeding to block 230.

The performance of block 230, in the present example, is implemented via the receipt of peripheral device identifiers and charge data at the application 140 from the controller 138. In some examples, the application 140 itself makes the determination at block 225, while in other examples, the controller 138 makes the determination at block 225, such that the application 140 receives only the peripheral device identifiers that are to be presented (as opposed to all peripheral device identifiers). In any event, it will be understood that no communications link (e.g. a link usable by the application 144 to communicate with a peripheral device 108) has been established as of yet.

Figure 4:
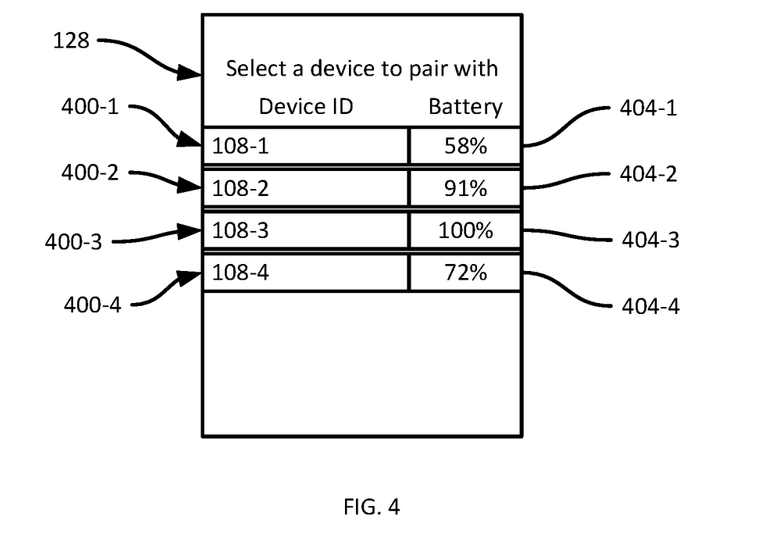
FIG. 4 is a diagram illustrating an example performance of block 230 of the method of FIG. 2.
Figure 5:
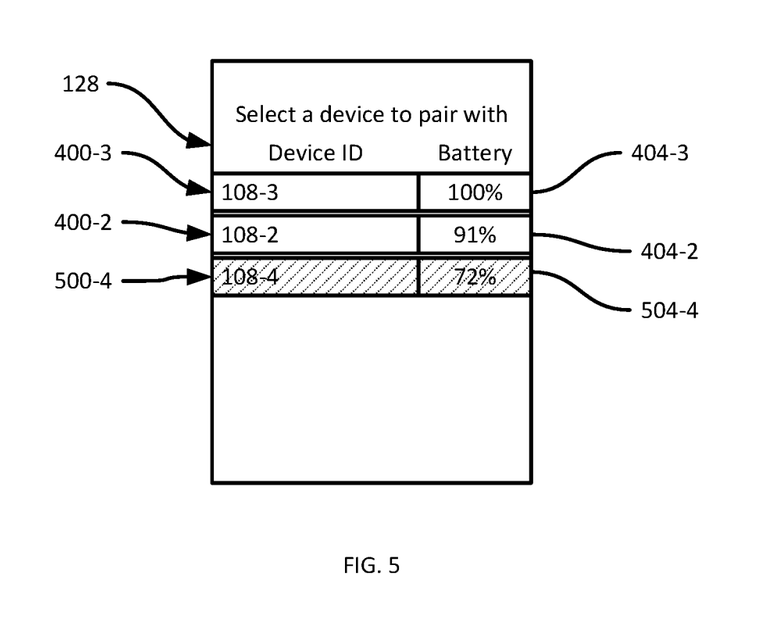
FIG. 5 is a diagram illustrating another example performance of block 230 of the method of FIG. 2.

FIGS. 4 and 5 illustrate example performances of block 230. FIG. 4, in particular, illustrates an example in which all peripheral devices 108 identified in the responses 304 received at block 220 are presented via the output assembly (e.g. a display, as illustrated in FIG. 4). Thus, the output assembly 128 is controlled by the processor (e.g. via execution of the application 140) to render four selectable elements 400-1, 400-2, 400-3 and 400-4, each corresponding to one of the responses 304 illustrated in FIG. 3. Each selectable element 400 also includes a respective charge indicator 404-1, 404-2, 404-3 and 404-4. In the present example, the charge indicators 404 are identical to the charge data received in the responses 304. However, in other examples, the charge indicators 404 can be derived from, but not identical to, the charge data in the responses 304. The charge indicators 404 can be, for example, estimated run times as mentioned above, scores (e.g. from one to ten) derived from the charge data, or the like.

The charge indicators 404 can also be implicit in some examples. For instance, the selectable elements 400 can omit the explicit charge indicators 404 as shown in FIG. 4, but can be ordered such that the peripheral device 108 with the greatest remaining battery capacity is listed first.

FIG. 5 illustrates another example performance of block 230, in which the selectable element 400-1 is omitted because the peripheral device 108-1 has a state of charge that falls below a threshold of 60%. Further, the selectable element 400-2 is listed below the selectable element 400-3, because the charge indicator 404-2 indicates a lower battery capacity than the charge indicator 404-3. Still further, an alternative selectable element 500-4 is provided instead of the selectable element 400-4. The selectable element 500-4 lists the identifier of the peripheral device 108-4, and includes a charge indicator 504-4, but is rendered with shading or any other suitable highlight. The shading indicates that the charge indicator 504-4 exceeds the above-mentioned lower 60% threshold, but does not exceed a secondary threshold that is greater than the lower threshold. That is, the primary device 104 can compare charge data to both a lower threshold (e.g. below which peripheral devices 108 will not be listed at block 230), and a higher secondary threshold, below which peripheral devices will be listed at block 230 but marked as shown in FIG. 5.

It is contemplated that once peripheral devices 108 have been presented via the output assembly 128 at block 230, additional discovery responses 304 may be received. In such events, the primary device 104 can repeat blocks 220-230 to update the output assembly 128.

Returning to FIG. 2, at block 235 the primary device 104 determines whether a selection of one of the selectable elements 400 or 500 has been received via the input assembly 132. When the determination at block 235 is negative, the primary device 104 can continue to wait for a selection, or can return to block 220 and update the rendered information if further discovery responses 304 are received. In some examples, the primary device 104 can return to block 205 and send another discovery request.

When the determination at block 235 is affirmative, at block 240 the primary device 104 sends a pairing request to the peripheral device corresponding to the selected one of the selectable elements 400, 500. More specifically, the selection of a selectable element 400, 500 via the input assembly 128 is passed from the application 140 to the controller 138 as an instruction to initiate pairing with the corresponding peripheral device 108. The pairing request is specifically addressed to the selected peripheral device 108 (e.g. via the MAC address of the peripheral device 108 received at block 220).

At block 245, the peripheral device 108 receives the pairing request, and at blocks 250 and 255, the primary device 104 and the peripheral device 108, respectively, complete the pairing process to establish a communications link therebetween. For example, the pairing process completed via blocks 250 and 255 can include exchanging one or more encryption keys employed to encrypt data exchanged over the link.

Figure 6:
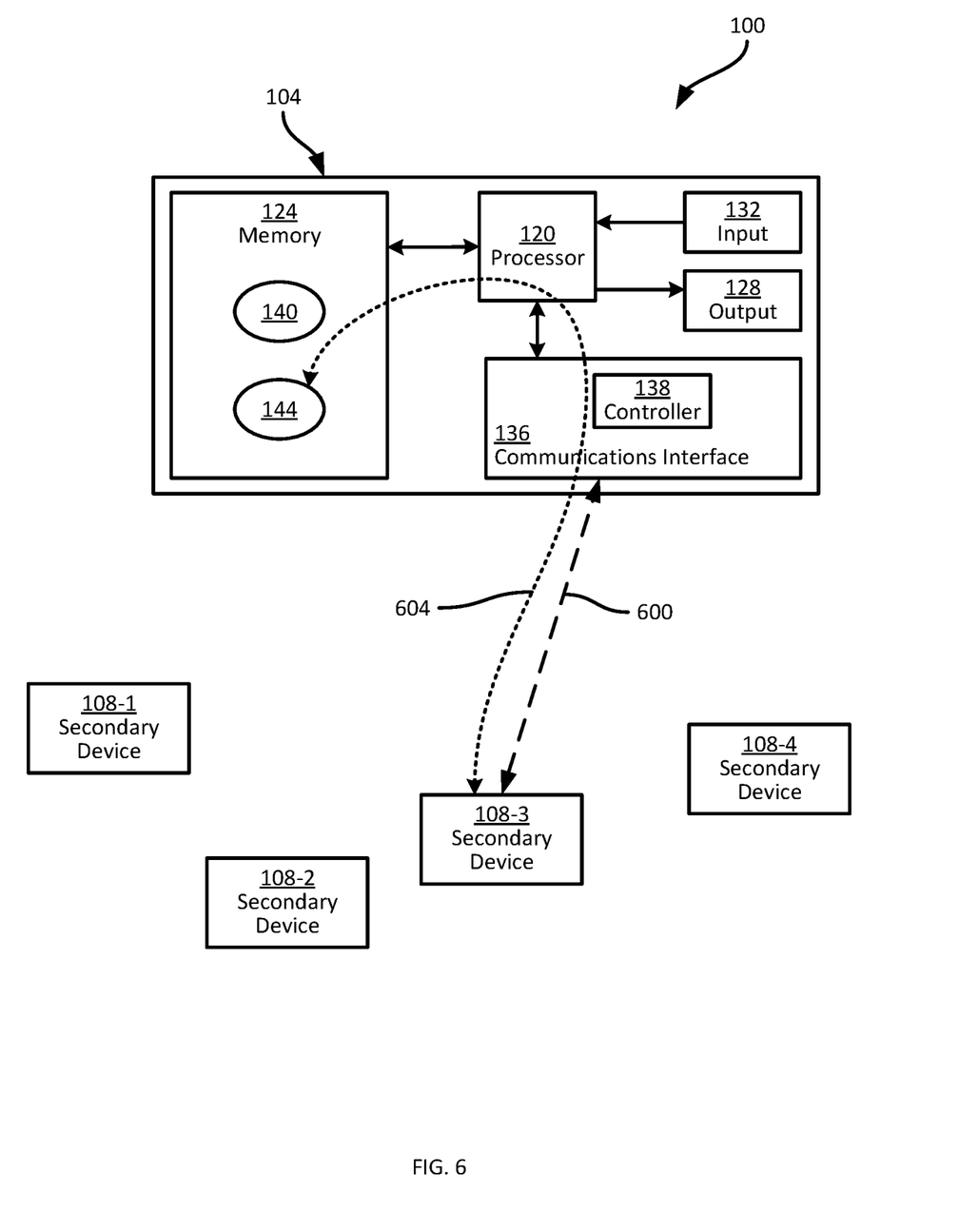
FIG. 6 is a block diagram illustrating a performance of blocks 250-255 of the method of FIG. 2.

FIG. 6 illustrates the system 100 following establishment of a link 600 between the peripheral device 108-3 and the primary device 104 via performance of the method 200. The link 600 enables the peripheral device 108 and the primary device 104 to exchange data, e.g. for processing at the primary device 104 via execution of the application 144, as shown by the path 604.

Variations to the above systems and methods are contemplated. For example, in some embodiments the primary device 104 can store selection criteria enabling the primary device 104 to automatically select a peripheral device 108 for connection. In such embodiments, the determination at block 235 is not a determination of whether input has been received selecting a peripheral device 108, but rather a determination of whether a peripheral device 108 is available that satisfies the selection criteria. The selection criteria can include a charge indicator threshold, a peripheral device type, and the like.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions.

The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A primary wireless communication device, comprising:
an output assembly;
a short-range communications assembly;
a pairing controller configured to:
send a discovery request for detection by a plurality of secondary wireless communication devices;
responsive to sending the discovery request, receive a plurality of discovery responses from respective secondary wireless communication devices, each discovery response containing a respective identifier of the corresponding secondary wireless communication device and respective charge data for the corresponding secondary wireless communication device;
compare the charge data from each of the discovery responses to a lower threshold and to an upper threshold greater than the lower threshold;
select a subset of the secondary wireless communication devices having charge data above the lower threshold;
control the output assembly to (i) present a list of respective identifiers and respective charge data of the secondary wireless communication devices in the subset, excluding the secondary wireless communication devices not in the subset, and (ii) indicate, in the list, the charge data that falls below the upper threshold;
obtain an instruction to establish a paired communication link with one of the secondary wireless communication devices selected from the list; and
responsive to obtaining the instruction, initiate a pairing stage to establish the paired communication link.

2. The primary wireless communication device of claim 1, wherein the paired communication link is based on a Bluetooth standard;
wherein each of the discovery responses is an Extended Inquiry Response (EIR) message; and
wherein the respective charge data is contained within a manufacturer data field of the EIR.

3. The primary wireless communication device of claim 1, further comprising an input assembly; wherein the controller is configured, in order to obtain the instruction, to receive a selection of the one of the secondary wireless communication devices from the list via the input assembly.

4. The primary wireless communication device of claim 1, wherein the respective charge data includes a battery level.

5. A method, comprising:
sending a discovery request from a primary wireless communication device, for detection by a plurality of secondary wireless communication devices;
responsive to sending the discovery request, receiving a plurality of respective discovery responses at the primary wireless communication device from respective secondary wireless communication devices, each discovery response containing a respective identifier of the corresponding secondary wireless communication device and respective charge data for the corresponding secondary wireless communication device;

comparing the charge data from each of the discovery responses to a lower threshold and to an upper threshold greater than the lower threshold;

selecting a subset of the secondary wireless communication devices having charge data above the lower threshold;

controlling an output assembly of the primary wireless communication device to (i) present a list of respective identifiers and respective charge data of the secondary wireless communication devices in the subset, excluding the secondary wireless communication devices not in the subset, and (ii) indicate, in the list, the charge data that falls below the upper threshold;

obtaining an instruction to establish a paired communication link with one of the secondary wireless communication devices selected from the list; and responsive to obtaining the instruction, initiating a pairing stage to establish the paired communication link.

6. The method of claim 5, wherein the paired communication link is based on the Bluetooth standard, and wherein each of the plurality of discovery responses is an Extended Inquiry Response (EIR) message.

7. The method of claim 5, wherein obtaining the instruction includes receiving a selection of the one of the secondary wireless communication devices from the list via an input assembly of the primary wireless communication device.

8. The method of claim 5, wherein the charge data includes a battery level.

* * * * *